_United States Patent_ [19]

Ohmori

[11] 4,194,216
[45] Mar. 18, 1980

[54] VIDEO PROJECTING APPARATUS
[75] Inventor: Masayuki Ohmori, Tokyo, Japan
[73] Assignee: Sony Corporation, Tokyo, Japan
[21] Appl. No.: 936,729
[22] Filed: Aug. 25, 1978
[30] Foreign Application Priority Data Sep. 25, 1977 [JP] Japan .................................. 52/101870

[51] Int. Cl.² .............................................. H04N 9/31
[52] U.S. Cl. ................................................... 358/60
[58] Field of Search ...................... 358/3, 60, 237, 55, 358/88, 238, 239, 250; 352/59-61, 66-68; 354/103; 353/31-33; 315/370, 371, 386

[56] References Cited
U.S. PATENT DOCUMENTS 4,087,835  5/1978  Nishimura et al. ..................... 358/60

_Primary Examiner_—John C. Martin
_Attorney, Agent, or Firm_—Lewis H. Eslinger; Alvin Sinderbrand

[57] ABSTRACT

An apparatus for projecting a compound video image onto a screen generally includes a plurality of image sources, such as cathode ray tubes, each forming a respective primary color image, and a plurality of lenses projecting the images from the image sources onto the screen to form a compound image. The projecting lenses are arranged so that the principal axes thereof are parallel to one another and arranged in a substantially symmetrical manner with respect to the center of the screen. Each of the color image sources includes an imaginary central axis normal to the plane of the image formed by the respective cathode ray tube, with each of the central axes being epaxially displaced from the principal axes of the respective projecting lenses and at least one of the imaginary central axes being outwardly inclined in respect to the principal axis of the respective projecting lens, with the degree of such inclination being determined in correspondence with the refractive index of the transparent material of the face plate of the respective cathode ray tube for the color of the respective color image.

5 Claims, 4 Drawing Figures

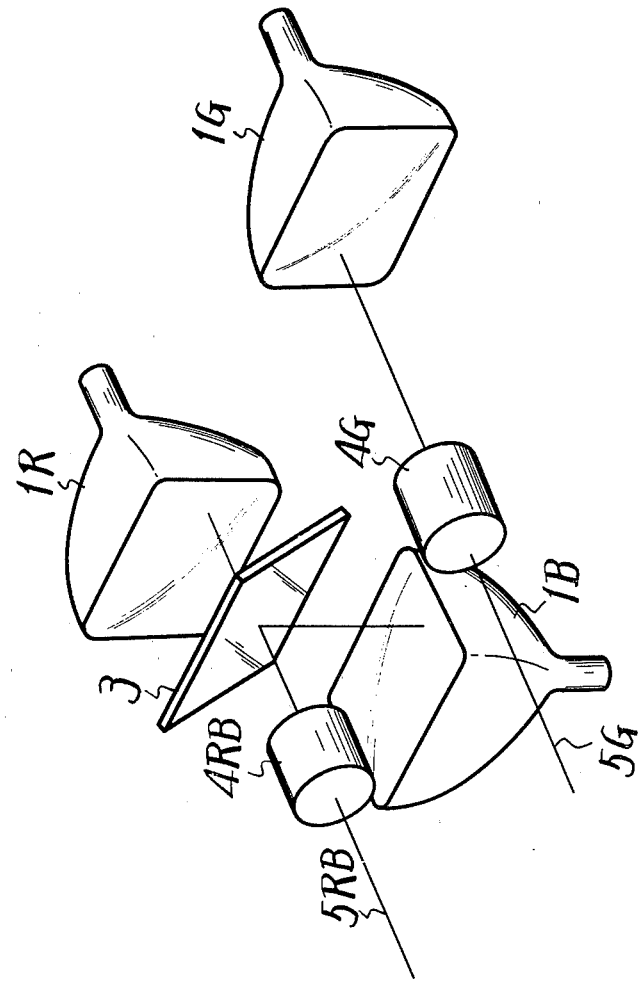
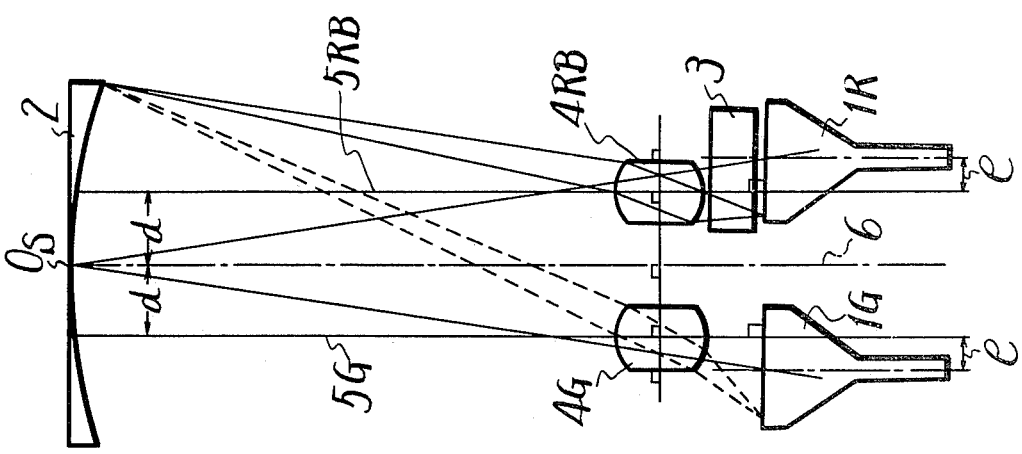

VIDEO PROJECTING APPARATUS

BACKGROUND OF THE INVENTION

1. Field of the Invention

The present invention relates generally to a video projecting apparatus including a plurality of cathode ray tubes and a plurality of projecting lenses. More particularly, the present invention relates to a color video projecting apparatus which eliminates the distortion of projected images on a screen by optically correcting these images.

2. Description of the Prior Art

A typical color image projector includes three cathode ray tubes, each cathode ray tube providing an image of a respective primary color i.e. red, green or blue color. The color image projector projects primary color images from the respective cathode ray tubes onto a screen through respective projecting lenses and produces a color image on the screen by mixing and compounding three primary color images. The light axis of each of the cathode ray tubes of the color projector is arranged coaxially with the axis of the corresponding projecting lens. In addition, the light axes corresponding to the color images of the respective cathode ray tubes are converged on the screen at the center thereof. Accordingly, since the incident angles of the respective light axes on the surface of the screen are different from each other, the distorted shapes of the projected color images differ. As a result, when the compound image is formed, misalignment results and a good color image can not be obtained.

In order to remove the above distortion, electric correcting circuits have been provided in the deflecting systems of cathode ray tubes corresponding to the respective colors to predistort images on the cathode ray tubes to predetermined shapes to obtain a color image on the screen with no distortion.

This, however, requires separate correcting circuits in the respective cathode ray tubes, resulting in a complicated construction and adjustment of the respective color images.

In order to correct the above distortion, one system, described in U.S. Pat. No. 4,087,835 to Nishimura et al. may be utilized. This system is also described in U.S. Application, Ser. No. 903,002, by Ohmori and Ito, filed May 4, 1978 for "PROJECTING APPARATUS", now abandoned.

The arrangement disclosed in the above-identified U.S. application will be now described with reference to the drawings. FIGS. 1 and 2 are schematic diagrams showing the apparatus described in the above-mentioned U.S. application which provide a base for the present invention. Referring to FIGS. 1 and 2, the apparatus includes, there are provided a projecting lens 4RB and a half mirror 3 common to red and blue cathode ray tubes 1R and 1B, and a projecting lens 4G for a green cathode ray tube 1G, respectively. Projecting lenses 4RB and 4G are so arranged that their optical or light axes 5RB and 5G are parallel with each other and perpendicular to a screen 2. In this manner, the light axes 5RB and 5G are parallel to a normal 6 to the screen 2 at its center $O_s$, and images 7RB and 7G, which are projected onto screen 2 by lenses 4RB and 4G, are free from any distortions, as shown in FIG. 3.

However, in utilizing this system, each of the light axes 5RB and 5G is displaced from the center $O_s$ of the screen 2 by a distance d, so that, as shown in FIG. 3, the images 7RB and 7G are shifted in the right and left directions by the distance d, respectively. Referring to FIG. 3, an image 7C is shown as a dotted line representing the image position when the light axes from the respective images are located at the center $O_S$ of screen 2, and one-dot chain lines 8RB, 8G and 8C show the center lines of the images 7RB, 7G and 7C, respectively. In order to correct this misalignment in the above apparatus, the cathode ray tubes 1R, 1G and 1B are outwardly and expaxially displaced by a predetermined length e with respect to the light axes 5RB and 5G in accordance with their distances from the center of the screen 2. Thus, without using any electrical correcting circuits, the images 7RB and 7G can be made coincident with each other at the center of the screen 2 and any misalignment is eliminated.

However, even with the above optical correction, there remains a distortion in the images 7RB and 7G due to other causes. For example, since the phosphor screens of the cathode ray tubes 1R, 1G and 1B are covered by glass face plates which each have a predetermined thickness, the image reproduced on each of the phosphor screens appears to be in a floating state near the surface of the face plate due to the refraction of glass when viewed from the outside of the face plate, and it is this floating image caused by refraction of the glass which is projected onto the screen 2.

When the cathode ray tubes 1R, 1G and 1B are displaced from the light axes 5RB and 5G, as set forth above, the apparent thicknesses of the face plates of the cathode ray tubes 1R, 1G and 1B are different at positions near and away from the light axes 5RB and 5G. Referring to FIG. 4, in the instance where an image 12 is reproduced on a phosphor screen 11 of the cathode ray tube 1R, the angle between the line from the end of the image 12 near the light axis 5RB to the center of the lens 4RB, and the surface of the phosphor screen 11, is $\theta_1$, while the same angle at the other end of the image 12, away from the light axis 5RB, is $\theta_2$, $\theta_1$ being larger than $\theta_2$ ($\theta_1 > \theta_2$). As a result, apparent thicknesses $l_1$ and $l_2$ of a face plate 13 of the cathode ray tube 1R, thicknesses $l_1$ and $l_2$ being measured at opposite ends of the image 12 viewed from the lens 4RB, can be expressed as follows, if the true thickness of the face plate 13 is given as l $$l_1 = \frac{l}{\sin \theta_1}$$

$$l_2 = \frac{l}{\sin \theta_2}$$

hence $$l_1 < l_2$$

If the apparent thickness of the face plate 13 is different at the respective positions, as set forth above, the apparent location of the image 12, which is caused by the refraction of the glass of the face plate 13, becomes varied due to the apparent thicknesses of the face plate 13 at the respective positions. In this manner, the image to be projected becomes inclined as shown by a dotted line 14 in FIG. 4, i.e., the image 14 to be projected is not parallel to the screen 2. As a result, although the light axis 5RB of the lens 4RB is perpendicular to the screen 2, the image projected onto the screen 2 is a distorted trapezoid, shown in FIG. 5 by a solid line.

Further, the inclinations of the images 14 of cathode ray tubes are opposite to each other as shown in FIG. 4, resulting in the image 7G projected from the cathode ray tube 1G being an inverse trapezoid to the image 7RB from the cathode ray tube 1R, as shown in FIG. 5 by the dotted line. In this manner the image 7RB does not coincide with the image 7G entirely, resulting in a misalignment in the reproduced image on the screen 2. It is to be noted that the image projected from the cathode ray tube 1B is coincident with the image 7RB from the cathode ray tube 1R since the optical path of both the cathode ray tubes 1R and 1B are same.

OBJECTS AND SUMMARY OF THE INVENTION

Accordingly, it is an object of the present invention to provide a video projecting apparatus free from the above-described defects of the prior art.

It is another object of the present invention to provide a video projecting apparatus in which images projected on a screen from a plurality of cathode ray tubes can be made coincident with one another by optical arrangements.

According to an aspect of the present invention, an apparatus for projecting a compound video image onto a screen generally comprises a plurality of image sources, such as cathode ray tubes, each forming a respective primary color image, and a plurality of lenses projecting the images from the image sources onto the screen to form a compound image. The projecting lenses are arranged so that the principal axes thereof are parallel to one another and arranged in a substantially symmetrical manner with respect to the center of the screen. Each of the color image sources includes an imaginary central light which is normal to the plane of the color image epaxially displaced from the principal axes of the respective projecting lenses and at least one of the central light axes is outwardly inclined to the principal axis of the respective lens, with the degree of such inclination being determined in correspondence to the refractive index of the transparent material of the face plate of the respective cathode ray tube for the color of the respective color image.

The above, and other objects, features and advantages of the present invention, will become apparent from the following description taken in conjunction with the accompanying drawings in which like numerals represent like parts.

BRIEF DESCRIPTION OF THE DRAWINGS

FIG. 1 is a schematic top plan view of a conventional prior art apparatus;

FIG. 2 is a schematic perspective view of the prior art apparatus of FIG. 1;

DESCRIPTION OF THE PREFERRED EMBODIMENT

One embodiment of the video projecting apparatus according to the present invention is described below with reference to FIG. 6.

Figure 6:
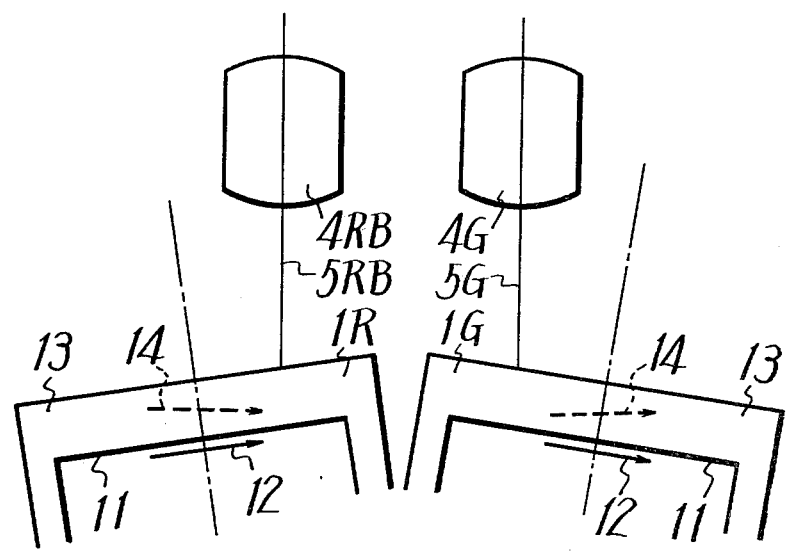
FIG. 6 is a schematic diagram showing a main part of one embodiment of the video projecting apparatus according to the present invention.

In the video projecting apparatus, according to the present invention, as shown in FIG. 6, the cathode ray tubes 1R, 1G and 1B are inclined by a predetermined angle with respect to the light axes 5RB and 5G, causing images 14, which are projected on the screen 2 to be parallel thereto, and eliminating any misalignment between the respective projected color images.

Figure 3:
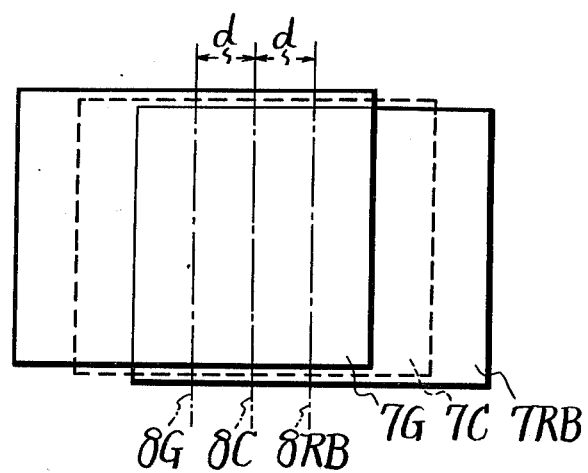
FIG. 3 is a schematic diagram of the misalignment of images on a screen without using the apparatus of FIG. 1.
Figure 4:
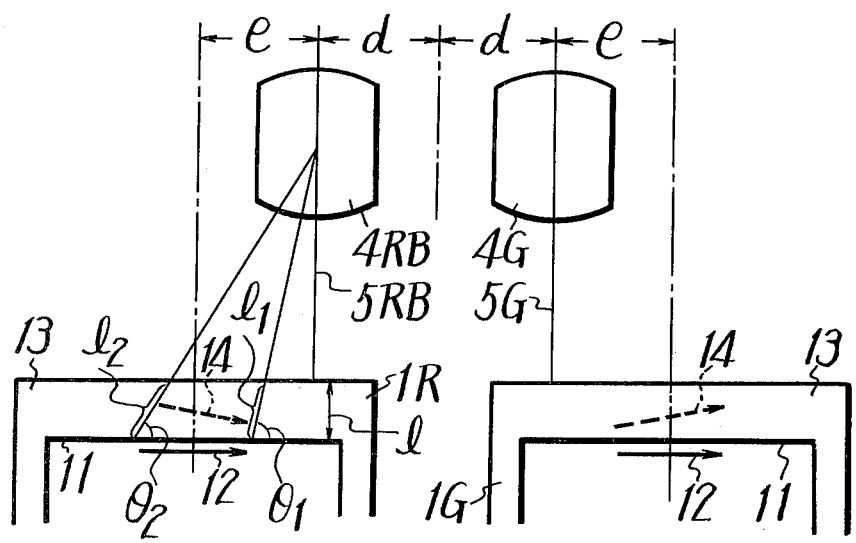
FIG. 4 is a partial, enlarged schematic diagram of the apparatus of FIG. 1.
Figure 5:
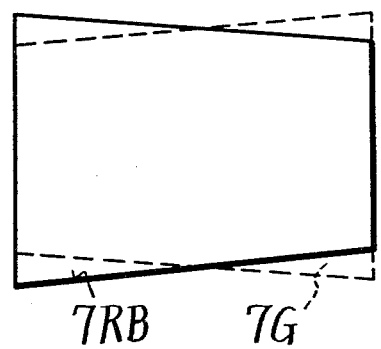
FIG. 5 is a schematic diagram of the distorted images on a screen resulting from the glass face plates of the cathode ray tubes of the apparatus of FIG. 4.

As shown in FIG. 6, the cathode ray tubes 1R and 1G are inclined in the outward direction by a predetermined angle, resulting in the images 12 on the phosphor screen 11 not being parallel to the screen 2, but the images 14, which are actually projected on the screen 2, being parallel thereto. As a result, the prior art trapezoidal distortions of the images 7RB and 7G shown in FIG. 5, are removed, and the images 7RB and 7G, coincide with each other so that perfect alignment of the respective color images is obtained. It is to be noted that, the remaining cathode ray tube 1B is inclined the same as the cathode ray tube 1R.

As described above, according to the present invention, the light or principal axes of the lenses 4RB and 4G are parallel to with each other, the cathode ray tubes are displaced from the light axes by a predetermined distance and the cathode ray tubes are inclined by a predetermined angle with respect to the light axes, respectively, resulting in the images projected onto the screen being perfectly coincident with each other.

In the above embodiment of the invention, it is assumed that the refractive index of glass of the cathode ray tubes 1R, 1G and 1B, is equal. However, in practice, since the refractive index of glass differs according to the wavelengths of colors utilized, i.e., red, green or blue, the inclination angles of the respective cathode ray tubes 1R, 1G and 1B are determined in accordance with the refractive indexes for the respective wavelengths of colors. In this manner, the inclination angles of the respective cathode ray tubes 1R, 1G and 1B will not be equal.

It will be apparent that many modifications and variations could be effected in the specifically described embodiment of the invention by one skilled in the art without departing from the spirit or scope of the novel concepts of the present invention, as defined by the appended claims.

I claim as my invention:

1. In an apparatus for projecting a compound video image onto a screen, and which comprises a plurality of color image sources, each forming a respective primary color image which has a central axis normal to the plane of the color image formed by said respective color image source, and a plurality of focusing means for projecting said color images onto said screen to form said compound image, said focusing means having respective principal axes which are arranged substantially parallel to one another; the improvement comprising each of said central axes being epaxially displaced from said principal axes of the respective focusing means for causing the projected color images to coincide on said screen, and at least one of said central axes being inclined to said principal axis of the respective focusing means.

2. An apparatus according to claim 1, wherein each of said color image sources includes a face plate of transparent material, and each of said central axes is inclined relative to the principal axes to a degree which corresponds to the refractive index of said transparent material of the face plate for the color of the respective color image.

3. An apparatus according to claim 1, wherein each of said plurality of image sources includes a cathode ray tube forming the respective primary color image, and each of said focusing means includes a lens for focusing the respective color image on said screen at which the color images are mixed and compounded.

4. An apparatus according to claim 1, wherein at least said one of said central axes is outwardly inclined to said respective principal axis in the direction from said image source toward said respective focusing means.

5. An apparatus according to claim 1, wherein said screen has a center and said principal axes of said focusing means are offset and arranged in a substantially symmetrical manner with respect to said center.

* * * * *